*W. W. Arnington,*

*Shoe Blacking Box.*

No. 102,646. Patented May 3, 1870.

Witnesses
J. H. Shumway
A. J. Tibbits

William W. Arnington
Inventor
By his Attorney
John E. Earle

United States Patent Office.

WILLIAM W. ARMINGTON, OF NEW HAVEN, CONNECTICUT, ASSIGNOR TO HIMSELF, STEPHEN L. USHER, AND FRED. A. WELTON, OF SAME PLACE.

Letters Patent No. 102,646, dated May 3, 1870.

IMPROVED STOVE-BLACKING BOX.

The Schedule referred to in these Letters Patent and making part of the same

To all whom it may concern:

Be it known that I, WILLIAM W. ARMINGTON, of New Haven, in the county of New Haven and State of Connecticut, have invented a new Improvement in Stove-blacking Pan; and I do hereby declare the following, when taken in connection with the accompanying drawings, and the letters of reference marked thereon, to be a full, clear, and exact description of the same, and which said drawings constitute part of this specification, and represent in—

Figure 1:
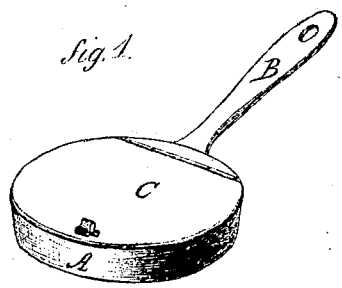

Figure 1, a perspective view closed when not in use; and

Figure 2:
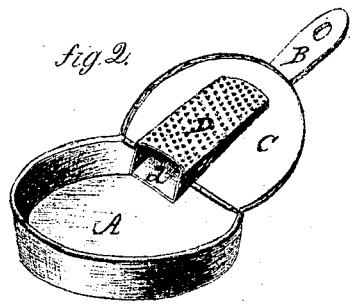

Figure 2, a perspective view open when in use.

The object of this invention is the arrangement of a device for grating blacking, combined with a pan within which to prepare the blacking for use.

A is the pan, usually provided with a handle, B.

C is the cover, formed so as to close the pan, as seen in fig. 1, or hinged to be turned back, as seen in fig. 2.

Upon the inside of the cover I arrange a grater, D, upon which the blacking is rubbed, passing through into a conductor, d, which leads into the pan. The requisite quantity having been rubbed off, it is prepared in the pan in the usual manner, and, when not required for use, the cover closes the pan, preserving all that may remain in a suitable state for future use.

As here represented, the grater is made independent of the cover, and attached thereto, yet it may be formed from the metal itself, the invention being to combine a grater with the cover of the pan.

I claim as my invention—

The pan A, provided with a cover C, having combined with, or arranged thereon, a grater D, substantially in the manner and for the purpose specified.

WILLIAM W. ARMINGTON.

Witnesses:
J. H. SHUMWAY,
A. J. TIBBITS.